(12) United States Patent
Berker et al.

(10) Patent No.: US 7,750,924 B2
(45) Date of Patent: Jul. 6, 2010

(54) METHOD AND COMPUTER-READABLE MEDIUM FOR GENERATING GRAPHICS HAVING A FINITE NUMBER OF DYNAMICALLY SIZED AND POSITIONED SHAPES

(75) Inventors: Ilan Berker, Seattle, WA (US); Matthew Kotler, Kenmore, WA (US); Janet L. Schorr, Seattle, WA (US); Scott A. Sherman, Seattle, WA (US); Thomas C. Underhill, Seattle, WA (US); Stephen T. Wells, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/081,323

(22) Filed: Mar. 15, 2005

(65) Prior Publication Data

US 2006/0209093 A1 Sep. 21, 2006

(51) Int. Cl.
- *G09G 5/00* (2006.01)
- *G06T 5/22* (2006.01)
- *G06F 17/00* (2006.01)
- *G06F 3/048* (2006.01)
- *G06K 9/40* (2006.01)
- *G06K 9/64* (2006.01)
- *G06K 9/36* (2006.01)

(52) U.S. Cl. .................. 345/619; 345/441; 345/624; 345/467; 345/660; 382/203; 382/254; 382/276; 715/200; 715/765; 715/800

(58) Field of Classification Search ......... 345/619–621, 345/440, 629–230, 660, 636, 441, 418, 581, 345/587, 624–625, 654, 472, 467–469; 715/764–765, 715/788, 798, 768, 200, 700, 800, 815; 382/203, 382/243, 254, 276, 277, 282, 284–286, 291
See application file for complete search history.

(56) References Cited

U.S. PATENT DOCUMENTS

| 5,214,755 A | 5/1993 | Mason ......................... 715/521 |
| 5,426,729 A * | 6/1995 | Parker ......................... 345/441 |
| 5,557,722 A | 9/1996 | DeRose |
| 5,596,691 A | 1/1997 | Good et al. |

(Continued)

FOREIGN PATENT DOCUMENTS

| EP | 0 431 638 A2 | 6/1991 |
| EP | 1 111 543 A2 | 6/2001 |
| EP | 1 111 543 A3 | 6/2001 |
| WO | WO 01/39019 A2 | 5/2001 |
| WO | WO 03/052582 A1 | 6/2003 |
| WO | WO 2004/046972 A1 | 6/2004 |

OTHER PUBLICATIONS

Copending U.S. Appl. No. 10/955,271, filed Sep. 30, 2004, entitled: "Method, System, and Computer-Readable Medium for Creating and Laying Out a Graphic Within an Application Program".

(Continued)

*Primary Examiner*—Wesner Sajous
(74) *Attorney, Agent, or Firm*—Merchant & Gould

(57) ABSTRACT

A method and computer-readable medium are provided for generating graphics having a finite number of dynamically sized and positioned shapes. According to the method, a relative size and position are defined for each of the shapes in a graphic. The relative size and position of the shapes may be defined relative to a canvas size or relative to other shapes. Once the size and position have been defined, the size and position are translated into size and position values expressed as relative to a canvas size. A mapping is also created between specific locations in a data set and the shapes. The graphic is generated utilizing the mapping and by sizing and positioning the shapes relative to the current canvas size. If a new canvas size is detected, the size and position of the shapes may be recomputed relative to the new canvas size. The graphic may also be utilized within a dynamic graphic.

20 Claims, 11 Drawing Sheets

U.S. PATENT DOCUMENTS

| | | | |
|---|---|---|---|
| 5,619,631 A | 4/1997 | Schott | 345/440 |
| 5,649,216 A | 7/1997 | Sieber | 715/506 |
| 5,669,006 A | 9/1997 | Joskowicz et al. | 715/517 |
| 5,732,229 A | 3/1998 | Dickinson | 715/764 |
| 5,818,447 A | 10/1998 | Wolfe et al. | |
| 5,903,902 A | 5/1999 | Orr et al. | 707/517 |
| 5,909,220 A | 6/1999 | Sandow | |
| 5,956,737 A | 9/1999 | King et al. | 715/517 |
| 5,999,731 A | 12/1999 | Yellin et al. | 395/704 |
| 6,057,842 A | 5/2000 | Knowlton et al. | |
| 6,057,858 A | 5/2000 | Desrosiers | |
| 6,081,816 A | 6/2000 | Agrawal | 715/521 |
| 6,166,738 A | 12/2000 | Robertson et al. | 345/355 |
| 6,173,286 B1 | 1/2001 | Guttman et al. | 707/100 |
| 6,189,132 B1 | 2/2001 | Heng et al. | 716/11 |
| 6,204,859 B1 | 3/2001 | Jouppi et al. | |
| 6,256,650 B1 | 7/2001 | Cedar et al. | 707/517 |
| 6,289,502 B1 | 9/2001 | Garland et al. | 717/2 |
| 6,289,505 B1 | 9/2001 | Goebel | 717/9 |
| 6,301,704 B1 | 10/2001 | Chow et al. | 717/9 |
| 6,305,012 B1 | 10/2001 | Beadle et al. | 717/5 |
| 6,308,322 B1 | 10/2001 | Serocki et al. | 717/9 |
| 6,324,686 B1 | 11/2001 | Komatsu et al. | 717/5 |
| 6,405,225 B1 | 6/2002 | Apfel et al. | |
| 6,667,750 B1 | 12/2003 | Halstead et al. | 715/788 |
| 6,826,727 B1* | 11/2004 | Mohr et al. | 715/235 |
| 6,944,830 B2 | 9/2005 | Card et al. | 715/853 |
| 6,956,737 B2 | 10/2005 | Chen et al. | |
| 7,055,095 B1 | 5/2006 | Anwar | 715/523 |
| 7,107,525 B2 | 9/2006 | Purvis | 715/517 |
| 7,178,102 B1 | 2/2007 | Jones et al. | |
| 7,348,982 B2* | 3/2008 | Schorr et al. | 345/441 |
| 7,379,074 B2 | 5/2008 | Gerhard et al. | |
| 7,423,646 B2 | 9/2008 | Danton | |
| 2001/0051962 A1 | 12/2001 | Plotkin | 707/522 |
| 2002/0065852 A1 | 5/2002 | Hendrickson et al. | |
| 2002/0111969 A1 | 8/2002 | Halstead | 707/517 |
| 2004/0133854 A1 | 7/2004 | Black | 715/517 |
| 2004/0148571 A1 | 7/2004 | Lue | 715/514 |
| 2004/0205602 A1 | 10/2004 | Croeni | 715/517 |
| 2005/0007382 A1* | 1/2005 | Schowtka | 345/619 |
| 2005/0091584 A1 | 4/2005 | Bogdan et al. | |
| 2005/0094206 A1 | 5/2005 | Tonisson | 358/1.18 |
| 2005/0132283 A1 | 6/2005 | Diwan et al. | 715/517 |
| 2005/0157926 A1 | 7/2005 | Moravec | |
| 2005/0273730 A1* | 12/2005 | Card et al. | 345/440 |
| 2005/0289466 A1 | 12/2005 | Chen | 715/731 |
| 2006/0064642 A1 | 3/2006 | Iyer | 715/730 |
| 2006/0066627 A1 | 3/2006 | Gerhard et al. | |
| 2006/0066631 A1* | 3/2006 | Schorr et al. | 345/619 |
| 2006/0070005 A1* | 3/2006 | Gilbert et al. | 715/763 |
| 2006/0212801 A1 | 9/2006 | Berker et al. | |
| 2006/0277476 A1 | 12/2006 | Lai | 715/760 |
| 2006/0294460 A1 | 12/2006 | Chao et al. | 715/520 |
| 2007/0006073 A1 | 1/2007 | Gerhard et al. | |
| 2007/0055939 A1 | 3/2007 | Furlong et al. | 715/731 |
| 2007/0112832 A1 | 5/2007 | Wong | |
| 2008/0046803 A1 | 2/2008 | Beauchamp et al. | |
| 2008/0136822 A1 | 6/2008 | Schorr et al. | 345/441 |
| 2008/0282147 A1 | 11/2008 | Schorr | 715/247 |
| 2008/0288916 A1 | 11/2008 | Tazoe | |
| 2009/0019453 A1 | 1/2009 | Kodaganur | |
| 2009/0327954 A1 | 12/2009 | Danton | |

OTHER PUBLICATIONS

Copending U.S. Appl. No. 10/957,103, filed Sep. 30, 2004, entitled: "Editing the Text of an Arbitrary Graphic Via a Hierarchical List".

Copending U.S. Appl. No. 11/081,324, filed Mar. 15, 2005, entitled: "Method and Computer-Readable Medium for Fitting Text to Shapes Within a Graphic".

U.S. Office Action dated Apr. 17, 2007 cited in U.S. Appl. No. 10/955,271.

U.S. Office Action dated Jun. 29, 2007 cited in U.S. Appl. No. 11/081,324.

U.S. Final Office Action dated Dec. 11, 2007 cited in U.S. Appl. No. 11/081,324.

European Search Report dated Feb. 13, 2006.

U.S. Official Action dated Apr. 20, 2006 cited in U.S. Appl. No. 10/955,271.

U.S. Office Action dated May 12, 2008 cited in U.S. Appl. No. 11/081,324.

European Communication dated Dec. 17, 2008 cited in Application No. 06111105.0-1527 /1703417.

U.S. Office Action dated Jan. 14, 2009 cited in U.S. Appl. No. 10/957,103.

Chinese Second Office Action dated Feb. 20, 2009 cited in Application No. 200610004498.4.

Mexican Office Action dated Dec. 4, 2008 cited in Application No. PA/a/2005/009276.

Chinese Third Office Action dated Jun. 19, 2009 cited in Application No. 200610004498.4.

EP Communication dated Jul. 10, 2009 cited in Application No. 06 111 105.0.

U.S. Final Office Action dated Jul. 21, 2009 cited in U.S. Appl. No. 10/957,103.

"Show Me Microsoft® Office Powerpoint® 2003" by Steve Johnson, Perspection, Inc., Publisher: Que, Publication Date: Oct. 2, 2003, Print ISBN-10; 0-7897-3009-X; Print ISBN-13: 978-0-7897-3009-1, 21 pgs.

U.S. Final Office Action dated Nov. 26, 2008 cited in U.S. Appl. No. 11/081,324.

U.S. Office Action dated Mar. 19, 2008 cited in U.S. Appl. No. 10/957,103.

Russell Borland, "Running Microsoft Word 97", 1997, Published by Microsoft Press, Pertinent pp. 60-61.

U.S. Final Office Action dated Sep. 12, 2008 cited in U.S. Appl. No. 10/957,103.

U.S. Office Action dated May 16, 2007 cited in U.S. Appl. No. 10/957,103.

U.S. Final Office Action dated Oct. 23, 2007 cited in U.S. Appl. No. 10/957,103.

U.S. Office Action dated Oct. 31, 2006 cited in U.S. Appl. No. 11/013,630.

U.S. Appl. No. 12/035,878, filed Feb. 22, 2008 entitled "Method, System, and Computer-Readable Medium For Creating and Laying Out A Graphic Within An Application Program".

U.S. Final Office Action dated Oct. 3, 2006 cited in U.S. Appl. No. 10/995,271.

EP Search Report cited in EP 05 10 5366.8-2218 dated Jan. 2, 2006.

EP Search Report cited in EP 05 10 8636.1-2218 dated Jan. 2, 2006.

"Proquis Compliance Management & Document Control Solutions", http://www.proquis.com/allclear-text2chart.asp, 1 pg.

"Exploring the Layouts", 1999 Software Publishing Corporation, 2 pgs.

"Create Diagrams in Word 2002, Excel 2002, and PowerPoint 2002", http://office.microsoft.com/en-us/assistance/HA010346141033. aspx, 2 pgs.

Roderick Singleton, "OpenOffice.org User Guide for Version 1.1.x", May 7, 2004, Online, XP002348571, retrieved from the Internet: URL:www.openoffice.org>, retrieved Sep. 30, 2005; pp. 253-284.

Anonymous: "Extract of Online-Help for OpenOffice Impress (Stylist)", Ver. 1.1.5, German Version, online, Apr. 2004.

Chinese Office Action dated Jul. 4, 2008 cited in Application No. 200510099652.6.

Chinese Office Action dated Aug. 29, 2008 cited in Application No. 200610004498.4.

Mexican Office Action dated May 25, 2009 cited in Application No. PA/a/2005/009276.

U.S. Office Action dated Nov. 27, 2006 cited in U.S. Appl. No. 11/172,279.

"Styling Nested Lists," [online] Oct. 19, 2003 [accessed Nov. 13, 2006], SimpleBits, LLC, Retrieved from Internet URL:http://www.simplebits.com/notebook2003/10/19/styling_nestled_ lists:html, pp. 1-5.

John Gallant et al., Archive.org archive of "CSS Flyouts—Part One," [online] Jun. 24, 2005 [accessed Nov. 13, 2006], CommunityMX, Retrieved from Internet URL:http://web.archive.org/web/20050624075147/www.htttp://communitymx,com/content/article.cfm?page=3&cid=55A69, 2 pgs.

U.S. Final Office Action dated May 17, 2007 cited in U.S. Appl. No. 11/172,279.

U.S. Office Action dated Mar. 6, 2008 cited in U.S. Appl. No. 11/172,279.

U.S. Final Office Action dated Aug. 19, 2008 cited in U.S. Appl. No. 11/172,279.

U.S. Office Action dated Apr. 29, 2009 cited in U.S. Appl. No. 11/172,279.

"Css Zen Garden: The Beauty in CSS Design," Retrieved from archive.org.http://web.archive.org/web/20031001180317/http://www.csszengarden.com/, Oct. 1, 2003, retrieved Nov. 8, 2009, 3 pgs.

U.S. Office Action dated Feb. 18, 2010 cited in U.S. Appl. No. 10/957,103.

"Show Me Microsoft® Office Powerpoint® 2003" by Steve Johnson, Perspection, Inc., Publisher: Que, Publication Date: Oct. 2, 2003, Print ISBN-10; 0-7897-3009-X; Print ISBN-13: 978-0-7897-3009-1, 4 pgs.

Copending U.S. Appl. No. 12/723,127 filed Mar. 12, 2010 entitled "Reordering Nodes in a Hierarchal Structure".

yEd Graph Editor - Published Date: 2009; New yEd version 3.4.1, http://www.yworks.com/en/products_yed_about.html, 5 pgs.

LingCh by Elod Csirmaz - Retrieved Date: Jan. 11, 2010, http://www.postminart.org/csirmaz/lingch.txt., 5 pgs.

Australian Examiner's First Report dated Apr. 21, 2010 cited in Application No. 2005203708.

* cited by examiner

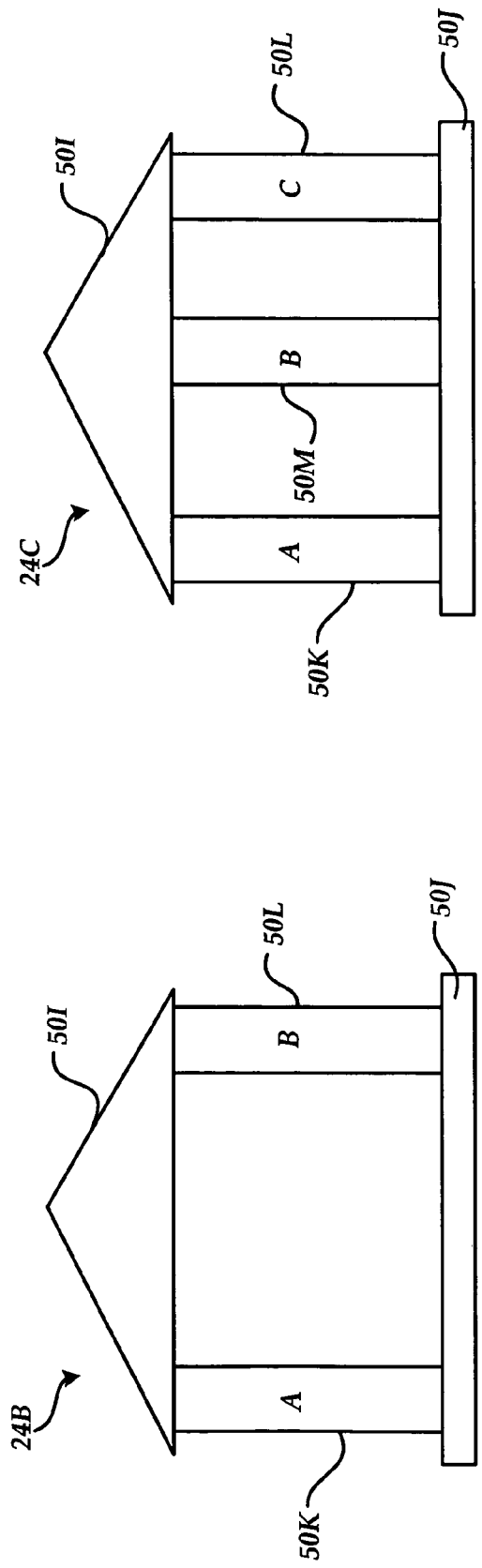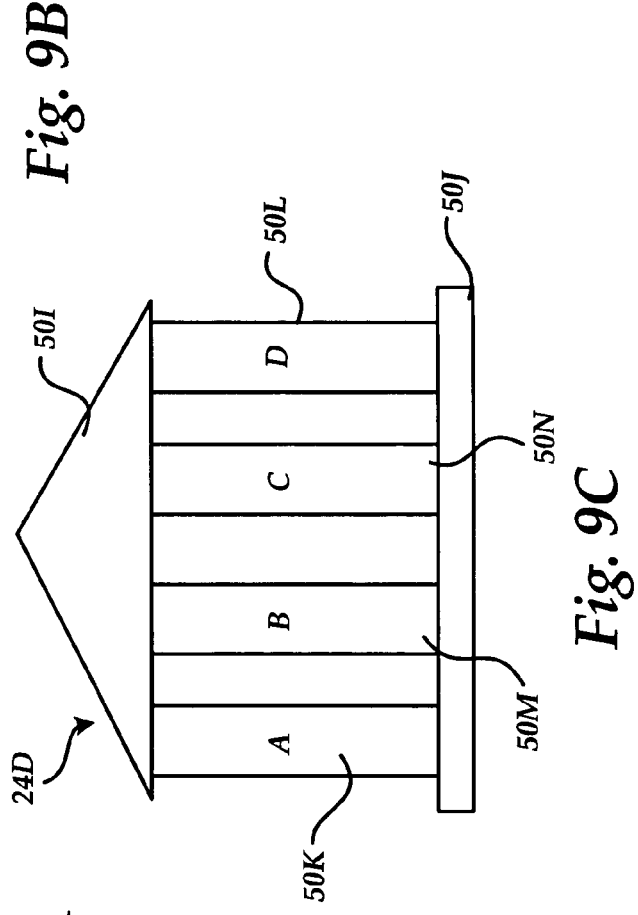
Fig. 9A
Fig. 9B
Fig. 9C

METHOD AND COMPUTER-READABLE MEDIUM FOR GENERATING GRAPHICS HAVING A FINITE NUMBER OF DYNAMICALLY SIZED AND POSITIONED SHAPES

CROSS-REFERENCE TO RELATED APPLICATIONS

This patent application is related to U.S. patent application Ser. No. 10/955,271, entitled "Method, System, and Computer-Readable Medium for Creating and Laying Out A Graphic Within an Application Program" filed on Sep. 30, 2004, and to U.S. patent application Ser. No. 10/957,103, entitled "Editing The Text Of An Arbitrary Graphic Via A Hierarchical List," filed on Sep. 30, 2004, and to U.S. patent application Ser. No. 11/081,324, entitled "Method and Computer Readable Medium for Fitting Text to Shapes Within a Graphic", filed concurrently herewith, each of which are assigned to the same assignee as the instant application. The aforementioned patent applications are expressly incorporated herein, in their entirety, by reference.

BACKGROUND OF THE INVENTION

Today's word processors and dedicated drawing application programs enable users to create both simple and complex graphics. These programs allow users to create graphics using a variety of shapes which may be annotated with text. The graphics created by these applications may be stand-alone documents or incorporated into text documents. Despite the advantages offered by these programs, however, today's versions of these programs suffer from several drawbacks which hinder the creation and layout of graphics by the typical user.

One particular drawback of current drawing programs is a result of shortcomings present in the creation of dynamic graphics. Dynamic graphics are graphics that may include a potentially infinite number of shapes that size and position themselves based upon the overall number of shapes required to hold the data. For instance, one example of a dynamic graphic is a flowchart in which new shapes are dynamically added, sized, and positioned, each time new data is added to the flowchart. A flowchart lends itself well to dynamic creation as do some other types of graphics, such as organizational charts.

While some types of graphics lend themselves well to dynamic creation, other types of graphics do not. In particular, a category of graphics work best with a specific finite number of shapes. Examples of this type of graphic include a three-sided triangle, a pillar graphic that requires at least two pillars, or pairs of arrows arranged in specific configurations. Graphics within this category often do not lend themselves to dynamic creation because they often include complex shapes or interlocking parts that require complex algorithms to determine the appropriate sizing and positioning. These graphics are generally too complex for the generalized algorithms utilized by dynamic layout routines. Certain types of graphics also do not work with dynamic layout routines because these graphics are created to display a specific set of data. For these graphics the placement and sizing of shapes oftentimes must be exact to achieve the desired result. Graphics generated dynamically from data cannot maintain specific tolerances and still be adaptive to the graphic generating the data.

Another frustration for users of current drawing programs stems from the limitations of the graphic templates provided by these programs. When creating graphics from such templates, a user often has to make manual adjustments to the graphic unless their data fits the template exactly. If nodes are added to or removed from the graphic, the graphic structure must be recreated. Alternatively, a user may be forced to select a template that best fits their data rather than selecting the template that is simply the best for the user's intended purpose. Moreover, a user is often required to edit and resize text and shapes within the graphic to fit their data while preserving the overall structure of the graphic. Additionally, as the size of the canvas containing the graphic changes, the user must manually recreate or resize shapes to take best advantage of the available space. In some cases, the graphic may scale with the canvas size but this typically results in less than optimal placement and size of the shapes and results in additional manual adjustment by the user. This process of continually adjusting the size of text and shapes to fit the user's data set and the canvas size can be extremely time consuming and frustrating for a user.

It is with respect to these considerations and others that the various embodiments of the present invention have been made.

BRIEF SUMMARY OF THE INVENTION

In accordance with the present invention, the above and other problems are solved by a method and computer-readable medium for generating graphics having a fixed number of shapes. By defining the size and location of the shapes and associating the shapes with specific locations in a data set structure, the graphics can be reused with different sets of the same structure in different size drawing areas while maintaining the same look.

According to a method provided in one embodiment of the invention, a relative size and position are defined for each of the shapes in a graphic. The relative size and position of the shapes may be defined relative to a canvas size or, alternatively, the size and position of the shapes may be defined relative to other shapes. In order to define a relative size and position for the shapes, the size and position of each dimension of a shape is first defined utilizing two points on the shape, one point on the shape and the width of the shape, or one point on the shape and the height of the shape. Once the size and position have been defined, the size and position are translated into size and position values expressed relative to a canvas size (also referred to herein as a "drawing size").

Once the size and position of the shapes within a graphic have been expressed as relative values, a mapping may be created between specific locations in a data set structure and the shapes. In this manner, when a data set is received to be mapped to the shapes, the appropriate shape to which each individual entry in the data set is to be mapped can be easily identified. The graphic may then be generated utilizing the mapping and by sizing and positioning the shapes relative to the current canvas size. If a new canvas size is detected, the size and position of the shapes may be recomputed relative to the new canvas size. A graphic generated in this manner may also be easily utilized within a dynamic graphic.

According to another embodiment of the invention, a computer-readable medium containing computer-executable instructions is provided. When executed by a computer, the computer-executable instructions will cause the computer to store a size and position for one or more shapes in a graphic, the size and position being expressed relative to a canvas size or to another shape. The size and position for each axis of a shape may be defined by two points on the axis or by one point on the axis and the size of the shape along the axis.

When executed, the computer-executable instructions will also cause the computer to map entries in a data set to the shapes based upon the location of each entry in the data set. The graphic may then be generated by utilizing the mapping between entries in the data set and by sizing and positioning the shapes relative to a current canvas size. If a new canvas size is detected, the size and position of the shapes may be recomputed relative to the new canvas size. The graphic may also be utilized within a dynamically generated graphic.

According to another method provided by the embodiments of the invention, a relative size and position are stored for each of the shapes in a graphic. The relative size and position for each shape may be defined relative to a canvas size or to another shape. The graphic is generated by utilize a mapping between the location of entries in a data set and by sizing and positioning the shapes relative to a current canvas size. If a change in the canvas size is detected, the size and position of the shapes are recomputed relative to the new canvas size. The number of shapes utilized within the graphic may also be determined based upon the number of entries within the data set.

The invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

BRIEF DESCRIPTION OF THE SEVERAL VIEWS OF THE DRAWINGS

FIGS. 9-10 are shape diagrams illustrating a process for generating a graphic utilizing the generated mapping within static and dynamic graphics according to one embodiment of the invention.

DETAILED DESCRIPTION OF THE INVENTION

Figure 1:
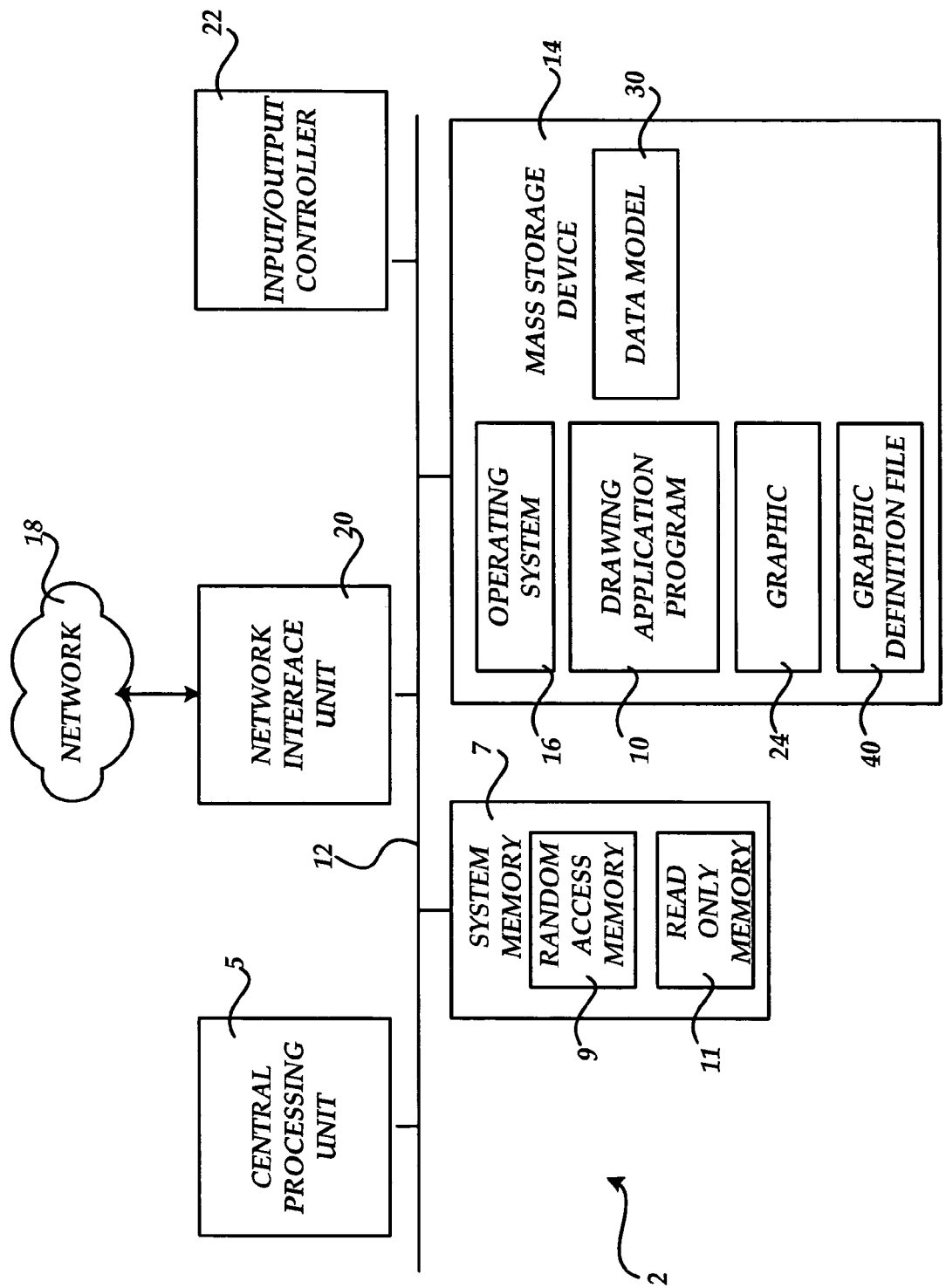
FIG. 1 is a computer system architecture diagram illustrating a computer system utilized in and provided by the various embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative computer architecture for a computer 2 utilized in the various embodiments of the invention will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a drawing application program 10. The drawing application program 10 is operative to provide functionality for the creation and layout of graphics, such as the graphic 24. According to one embodiment of the invention, the drawing application program 10 comprises any one of the programs in the OFFICE suite of application programs from MICROSOFT CORPORATION including the WORD, EXCEL, and POWERPOINT application programs. It should be appreciated, however, that the embodiments of the invention described herein may be utilized in any type of application program.

The mass storage device 14 may also store several components which are utilized in the creation and layout of graphics within the drawing application program 10. In particular, the components may include a data model 30 and a graphic definition file 40. In various embodiments of the invention, the drawing application program 10 reads in the graphic definition file 40 for instructions regarding the creation and layout of graphics. It will be appreciated that in one embodiment of the invention, the data model 30 and the graphic definition file 40 may be stored as individual files in the computer system 2 which are accessed by the drawing application program 10.

The data model 30 includes a collection of nodes, relationships, text, and properties that contains the content for constructing the graphic 24. The graphic definition file 40 is a collection of data which describes how to create a specific graphic layout. In various embodiments of the invention, the graphic definition file 40 may be formatted utilizing the extensible markup language ("XML"). As is understood by those skilled in the art, XML is a standard format for communicating data. In the XML data format, a schema is used to provide XML data with a set of grammatical and data type rules governing the types and structure of data that may be communicated. The XML data format is well-known to those skilled in the art, and therefore not discussed in further detail herein.

The aspects of a graphic described by the graphic definition file 40 include the name of a layout algorithm to use for each layout node, algorithm parameters, constraints, and constraint rules for constructing the layout tree, defaults for shape geometry and style properties, graphic classification data, and a sample data model. Additional details regarding the contents and use of the graphic definition file 40 can be found in U.S. patent application Ser. No. 10/955,271 , entitled "Method, System, and Computer-Readable Medium for Creating and Laying Out A Graphic Within an Application Program" filed on Sep. 30, 2004, which is expressly incorporated herein by reference.

Constraints are conditions used by a layout algorithm for creating a graphic. An example of a constraint is the value to be used for a shape's width. It will be appreciated that constraints may include numeric values or Boolean values. Numeric constraints can specify a specific numeric value (e.g., width=1 inch). Numeric constraints may also calculate their value by referring to other constraint values using references (e.g., height=width*0.75). Boolean constraints may include equality constraints which force all nodes in a set to have the same value for another constraint, and may include inequality constraints, where one constraint value is limited based on another constraint value (e.g. shape's width needs to be less-than or greater-than another shape's height).

Constraints may be propagated between layout nodes to enforce equality between drawing elements (e.g., all normal nodes have the same font size) or inequality (e.g., width of transition nodes should be <=normal node width). Constraints may be propagated by attaching a shared propagator to a constraint which propagates its states to other layout nodes. It will be appreciated that both constraints and constraint rules may be updated on the other nodes from the propagating constraint.

Constraint rules are a description of how to modify a set of constraints if they are unable to be met by a layout algorithm. For instance, a constraint may specify that a font size must be 14 points, but a constraint rule may specify that a font size can decrease to a minimum of 8 points. For example, constraints may be defined that comprise initial values describing how a shape and text within the shape should be laid out. Constraint rules may also be specified that comprise rules for modifying the constraints when application of the constraints does not result in text being successfully laid out within the boundaries of a shape.

As will be described in greater detail below, the drawing application program 10 may also provide functionality for creating a graphic 24 having a finite number of dynamically sized and positioned shapes. To create such a graphic 24, a graphic template may be defined that includes one or more shapes. The size and position of each shape is defined relative to a canvas size for the graphic 24. In this manner, when the canvas size is changed, the size and position of each shape can be adjusted to the new canvas size while retaining the look of the template. Moreover, according to one embodiment of the invention, a mapping may be provided for a graphic 24 that maps content in a data set to a shape within the graphic 24 based upon the position of each entry in the data set. In this manner, content can be programmatically assigned to a shape within a graphic 24 in a pre-defined manner as the content is entered by a user. Moreover, shapes may be dynamically added or removed from the graphic 24 based upon the amount of data that is present in the data set. Additional details regarding the operation of the drawing application program in this regard will be provided below with respect to FIGS. 2-10.

Figure 2:
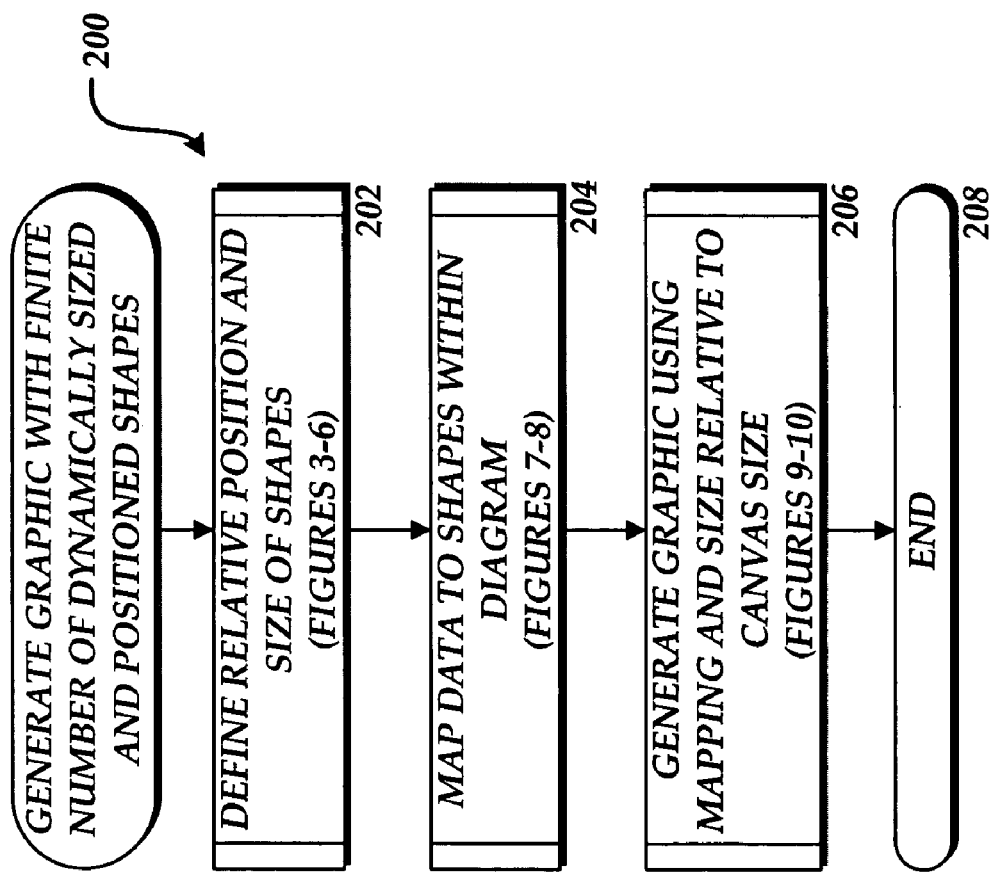
FIG. 2 is a flow diagram showing an illustrative process for generating a graphic having a finite number of dynamically sized and positioned shapes according to one embodiment of the invention.

Referring now to FIG. 2, an illustrative routine 200 will be described illustrating a process for generating a graphic with a finite number of dynamically positioned and sized shapes. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 2 and 3, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

The routine 200 begins at operation 202, where the relative position and size of each of the shapes within a graphic 24 are defined. As will be discussed in greater detail below with respect to FIGS. 3-6, the size and position of each shape is defined relative to the bounding area of the graphic (referred to herein as the canvas size or the drawing size). The size and position of a shape may also be defined relative to the location and size of another shape. The relative size and position values are then translated into relative values corresponding to the canvas size. The values are then expressed as constraints and stored in the graphic definition file 40. Additional details regarding this process are described below with respect to FIGS. 3-6.

Once the relative size and position of each shape has been defined and stored in the graphic definition file 40, the routine 200 continues to operation 204, where data in a data set is mapped to the shapes in the graphic 24. As will be described in detail below, a mapping may be defined and stored in the graphic definition file 40 that maps entries in a data set to shapes within the graphic 24. In particular, according to one embodiment of the invention, entries within the data set are mapped to shapes within the graphic 24 based upon the location of an entry within the data set. For instance, the first entry in the data set may be mapped to a first shape, the second entry in the data set may be mapped to a second shape, and so on. Additional details regarding this process are described below with reference to FIGS. 7-8.

Once the mapping has been created between entries in the data set and shapes within the graphic 24, the routine 200 continues to operation 206. At operation 206, the graphic is generated utilizing the mapping between entries and the data set and shapes within the graphic 24. In particular, the mapping is utilized to determine the content from the data set that should be displayed within each shape. Moreover, shapes are drawn on the canvas utilizing their relative size and position values in view of the current canvas size. If the canvas size changes, the size and position values are recomputed relative to the new canvas size and the shapes are redrawn. Additional details regarding this process are provided below with respect to FIGS. 9 and 10. From operation 206, the routine 200 continues to operation 208, where it ends.

Figure 3:
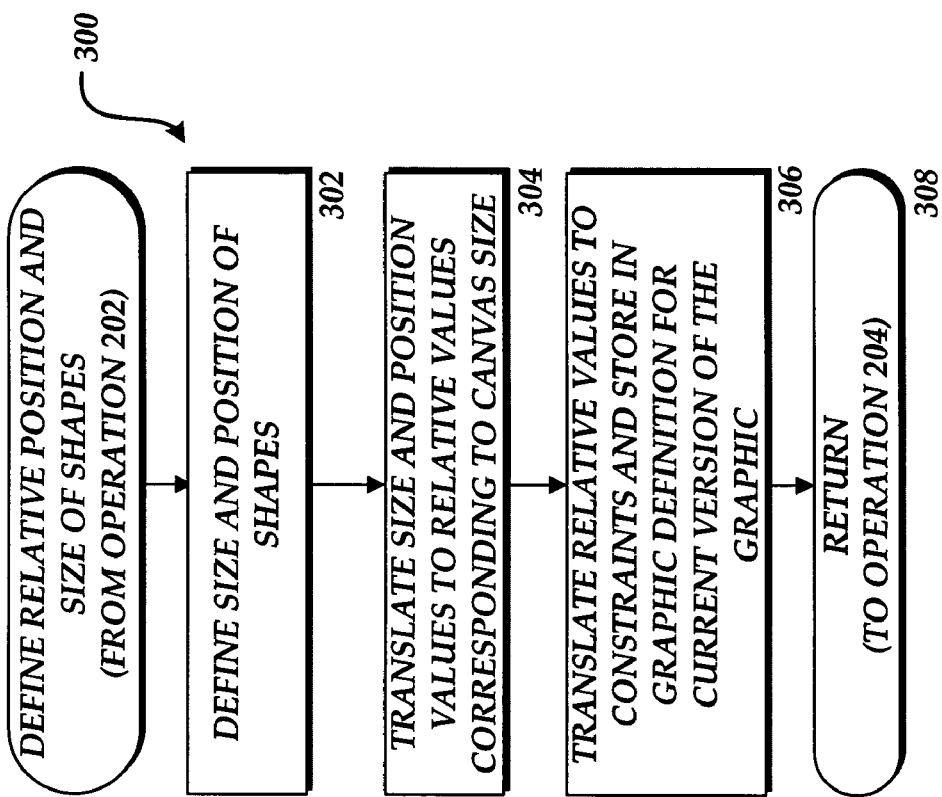
FIG. 3 is a flow diagram showing an illustrative process for defining a relative size and position of shapes within a graphic according to one embodiment of the invention.

Referring now to FIG. 3, an illustrative routine 300 will be described for defining the relative size and positions of the shape within a graphic 24 according to one embodiment of the invention. The routine 300 begins at operation 302, where the size and position of the shapes are defined. As will be described in greater detail below, the size of each shape may first be defined utilizing absolute values. The size of each axis of a shape may be defined utilizing two points on the axis, or one point and the size in that dimension. Moreover, the position of a shape may be expressed in absolute terms or as a percentage of the canvas area. The size and position of each shape may also be defined relative to another shape in the diagram 24. Additional details regarding the process of defining the size and position of each shape are provided below with respect to FIGS. 4-6.

From operation 302, the routine 300 continues to operation 304, where the size and position values for each shape are translated into relative values corresponding to the canvas size. For instance, the width for a rectangle within a graphic 24 may be specified as a percentage of the total canvas width, the upper left corner of the rectangle may be specified as being positioned as a percentage of the drawing area width from the drawing area's origin point (typically the upper left corner), the height of the rectangle may be specified as a percentage of the total canvas height, and so on. In this manner, the size and position of each shape is defined relative to the size of the canvas and can be translated into new relative values if the size of the canvas is changed. Additional details regarding this process are provided below with reference to FIGS. 4-6.

Once the size and position values for each shape have been translated into relative values, the size and position values are formed into constraints and stored in the graphic definition file 40 at operation 306. It should be appreciated that, according to one embodiment of the invention, different size and position values may be specified within the graphic definition file 40 for different versions of the graphic 24 and that the different versions of the graphic 24 may be selected at runtime based upon the amount of data present in the data set. For instance, a pillar diagram (a diagram showing multiple pillars positioned upon a base and supporting a roof) may be created that includes no less than two pillar shapes if two or fewer entries are in the data set, three pillar shapes if three entries are in the data set, four entries if four entries are present in the data set, and so on. Additional details regarding this process are described below with respect to FIG. 9. From operation 306, the routine 300 continues to operation 308, where it ends.

Figure 4:
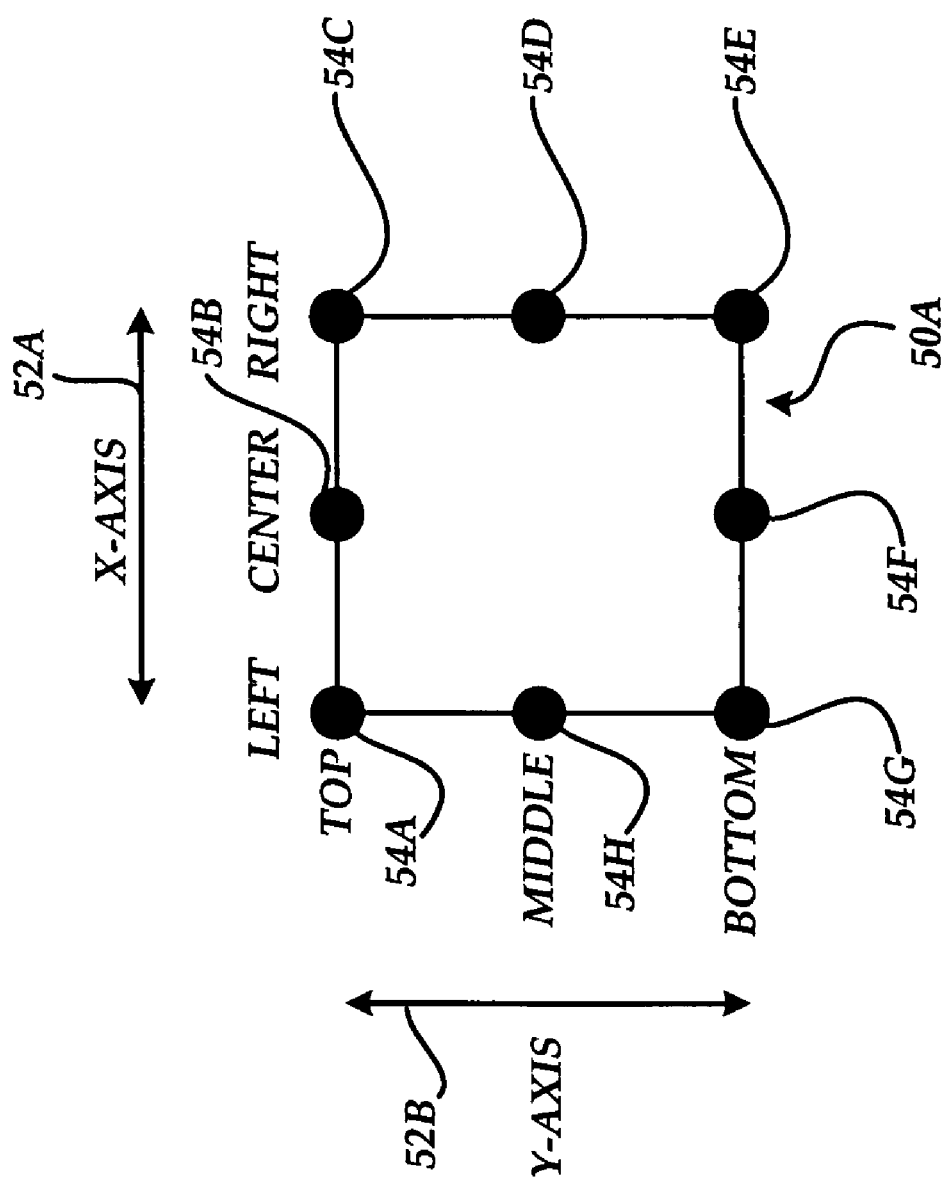
FIGS. 4-6 are shape diagrams that illustrate additional details regarding a process for defining a relative size and position for shapes in an embodiment of the invention.

Turning now to FIG. 4, additional details will be provided regarding the process performed according to one embodiment of the invention for defining the size and position of a shape within a graphic 24. In order to specify the width, height, and location of a shape, such as the shape 50A, a number of markers 54A-54H are defined on the shape. To define the information needed to size and position the shape, two values are needed on the x-axis 52A of the shape and two values are needed on the y-axis 52B of the shape. In particular, for each axis, the position of two of the markers may be specified or the position of one marker and the length of the shape in that dimension. As an example, on the x-axis 52A, a width and the position of one marker is needed or the position of two markers are needed. The position of one of the markers is also specified to indicate the position of the shape 50A. Additional details regarding this process are illustrated in and described below with respect to FIG. 5.

Figure 5:
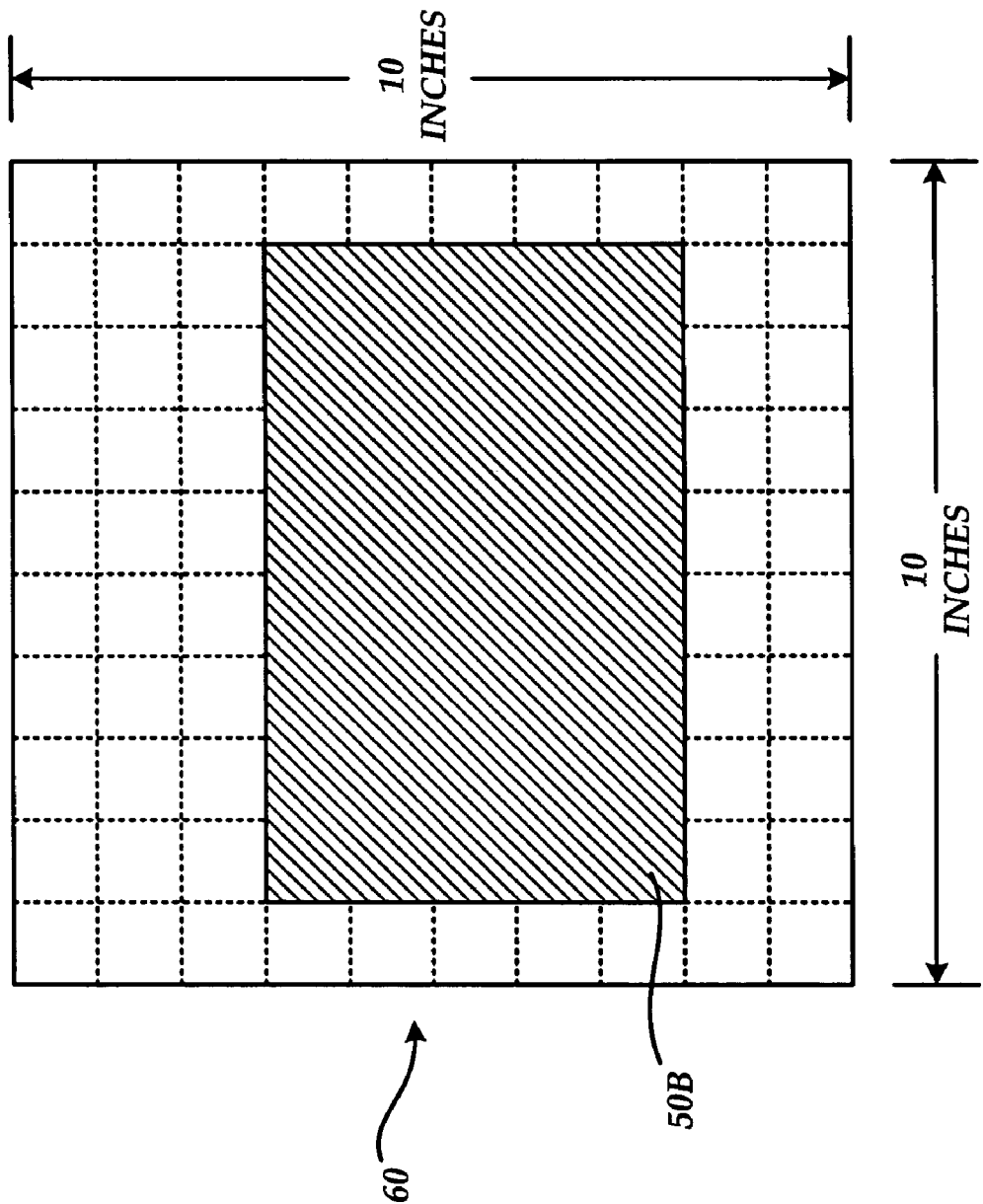

Referring now to FIG. 5, additional details will be provided regarding the process performed according to one embodiment of the invention for defining the size and position of a shape within a graphic 24. In particular, as shown in FIG. 5, a canvas size has been defined that is ten inches by ten inches. It should be appreciated that any canvas size may be utilized and that any unit of measurement may also utilized to specify its dimensions. As also shown in FIG. 5, a shape 50B has been defined. The size and position of the shape 50B may be specified in a number of ways. In particular, the width of the shape 50B (eight inches) and the horizontal location (one inch from left) may be specified to define the horizontal position and size and the height (five inches) and vertical location (three inches from the top) may define the vertical position and size. Alternatively, the horizontal location (one inch from the left) and the center of the shape (five inches from left) may define the horizontal position and size, and the top location (three inches from the top) and the bottom (eight inches from the top) may specify the vertical position and size. As another example, the width (eight inches) and the right position (nine inches from left) may specify the horizontal position and size, and the top (three inches from top) and bottom (eight inches from top) may be defined to specify the vertical position and size. Other permutations may also be utilized.

Figure 6:
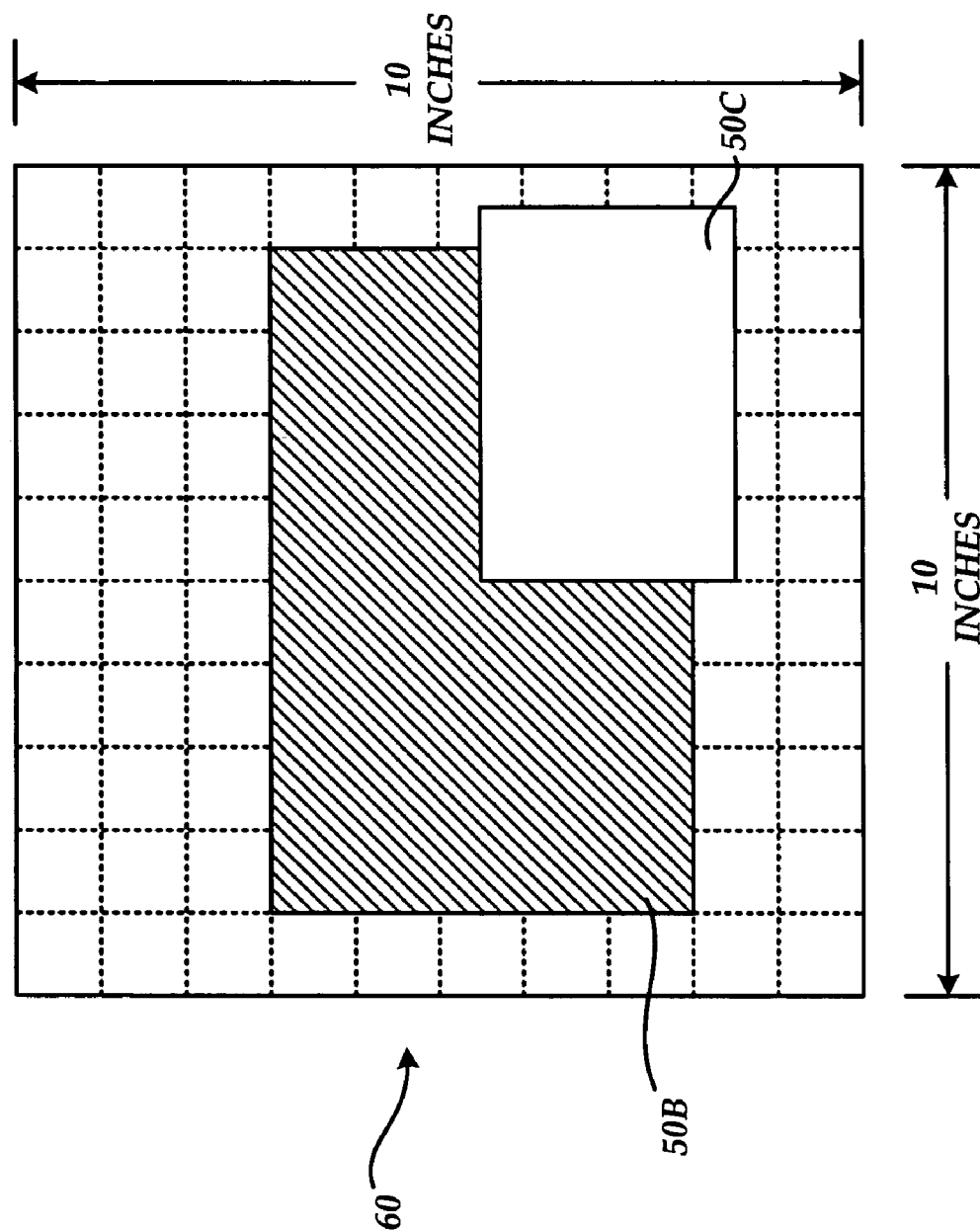

Turning now to FIG. 6, additional details will be provided regarding the process performed according to one embodiment of the invention for defining the size and position of a shape within a graphic 24. In the example described above with reference to FIG. 5, the size and position of the shape 50B is specified with reference to locations on the canvas 60. However, the size and position of a shape may also be specified in terms of relationships to other shapes within the canvas 60. For example, as shown in FIG. 6, another shape 50C may be defined. The size and position of the shape 50C may be specified with reference to the shape 50B. In particular, the size and position of the horizontal dimension of the shape 50C may be defined as having a width of four and one-half inches with the left corner being located at the center of the shape 50B. The size and position of the vertical dimension may be similarly specified as having a height of three inches and having a top position at the center of the shape 50B. An advantage to being able to specify position based upon another shape is that the reference shape may be positioned dynamically, and the new shape is placed explicitly in relation to the reference shape. This behavior may be utilized to simulate portions of a grouped shape, while having the simulated grouped shape dynamically sized and positioned within a graphic.

Figure 7:
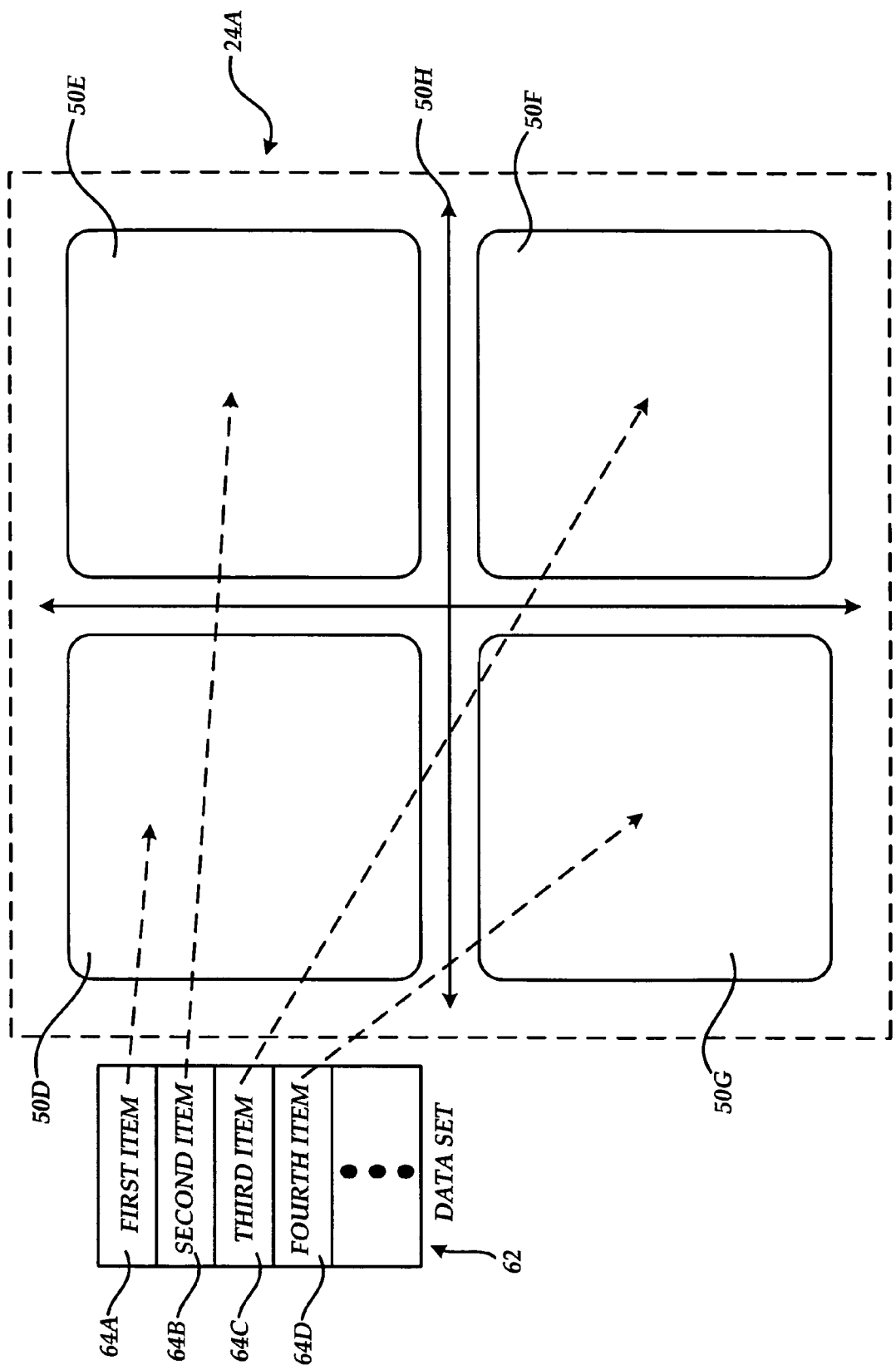
FIGS. 7-8 are shape diagrams illustrating a process utilized in embodiments of the invention for mapping entries in a data set to set to shapes within a graphic.
Figure 8:
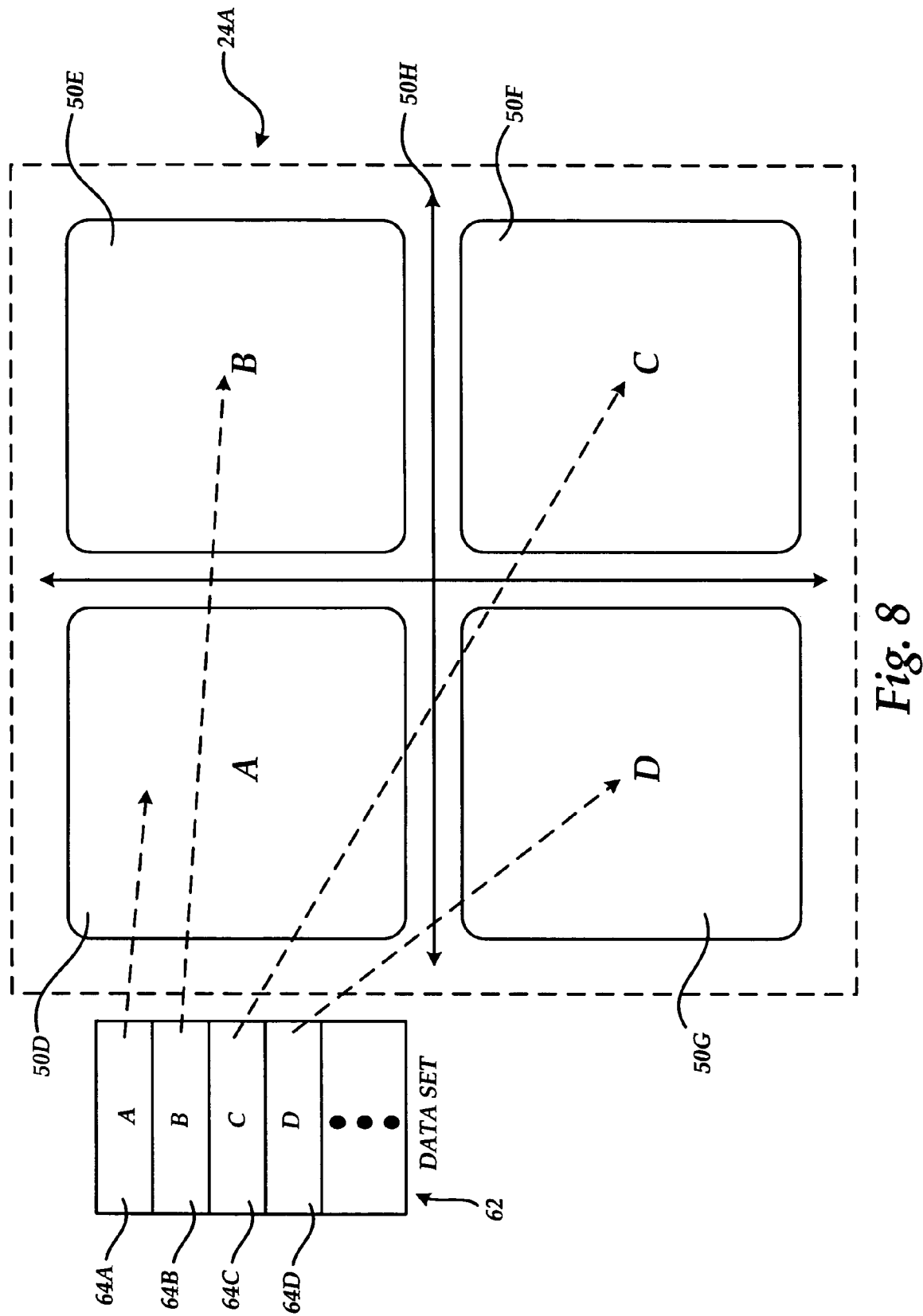

As discussed briefly above, once the size and position values for each shape have been defined, these values are translated into relative values corresponding to the canvas size. The relative size and position values are then formed into constraints and stored in the graphic definition file 40. In order to generate a graphic utilizing the shapes, data must be provided and mapped into the shapes. FIGS. 7 and 8 illustrate a process for defining a mapping between items in a data set and shapes.

Referring now to FIG. 7, aspects of the invention for mapping entries in a data set to set to shapes within a graphic will be described. FIG. 7 shows an illustrative graphic 24A that includes the shapes 50D-50H. A mapping is defined between a data set 62 and one or more of the shapes 50D-50H in the graphic 24A. In particular, as shown in FIG. 7, a mapping is defined that maps entries in the data set 62 to shapes within the graphic 24A based upon the position of data in the data set 62. The mapping does not depend upon the actual data located in the data set 62.

The illustrative mapping shown in FIG. 7 maps the contents of the first item 64A in the data set 62 to the shape 50D. The contents of the second item 64B are mapped to the shape 50E. The contents of the third item 64C are mapped to the shape 50F. The contents of the fourth item 64D are mapped to the shape 50G. It should be appreciated that not each of the items in the data set 62 must be mapped to shapes and that not each of the shape in a diagram must be mapped to content within the data set 62. If a location within the data set 62 is not associated with a shape, data contained within the location will not be displayed within the graphic. Moreover, it should be appreciated that although the data set 62 is illustrated in FIG. 7 as a list, the data need not have any particular structure or format to be utilized with the embodiments of the invention. As will also be described in greater detail below with respect to FIG. 9, the number of shapes shown within a graphic, and the size and location of the shapes, may be determined by the amount of data actually present in the data set 62.

Turning now to FIG. 8, additional aspects of the invention for mapping entries in a data set to set to shapes within a graphic will be described. In particular, FIG. 8 shows the same graphic 24A as illustrated in FIG. 7. However, in FIG. 8, actual data has been provided within the data set 62. The data may be provided, for instance, by a user typing into an outline pane for providing data for the graphic 24A. Data may also be provided through other means, including but not limited to copy/paste, importing, and other methods.

As shown in FIG. 8, the first item 64A in the data set 62 includes the letter 'A.' As a result of the mapping between the first item 64A and the shape 50D, the letter 'A' is displayed within the shape 50D. Similarly, as a result of the mapping between the second item 64B and the shape 50E, the letter 'B' is displayed within the shape 50E. A similar process is utilized to display the letters 'C' and 'D' within the shapes 50F and 50G, respectively. It should be appreciated that any text values may be provided within the entries of the data set 62 and the text may be sized appropriately to fit within the bounds of the shape that contains it.

Referring now to FIGS. 9A-9C, additional details regarding a process for selecting versions of a graphic based upon the amount of data in a data set will be described. As discussed briefly above, different size and position values may be specified within the graphic definition file 40 for different versions of the graphic 24. Moreover, the different versions of the graphic 24 may be selected at run-time based upon the amount of data present in the data set. FIGS. 9A-9C illustrate this process. In particular, as shown in FIG. 9, a pillar diagram may be defined that supports a range of two to four shapes to which data from the data set is mapped (e.g. the pillars). The diagram will never include fewer than two pillars and will never include more than four pillars, regardless of the amount of data in the data set.

In order to define a graphic having the behavior shown in FIGS. 9A-9C and described above, the relative sizes and positions of the shapes in the three versions of the graphic are defined and stored in the graphic definition file. Additionally, a mapping is created for each of the versions so that the data in the data set maps to the appropriate shapes. Moreover, data is stored in the graphic definition file 40 that defines how the versions of the graphic should be selected. In particular, the data indicates that the size, position, and mapping for the shapes 50I-50L in the graphic 24B shown in FIG. 9A should be utilized when the data set contains two or fewer entries. The data also indicates that the size, position, and mapping for the shapes 50I-50M in the graphic 24C shown in FIG. 9B should be utilized when the data set contains exactly three entries. The data also indicates that the size, position, and mapping for the shapes 50I-50N in the graphic 9C should be utilized when the data set contains four or more entries. It should be appreciated that defining and selecting versions of a graphic in this manner provides a great deal of flexibility in the type of graphics that may be created.

Figure 10:
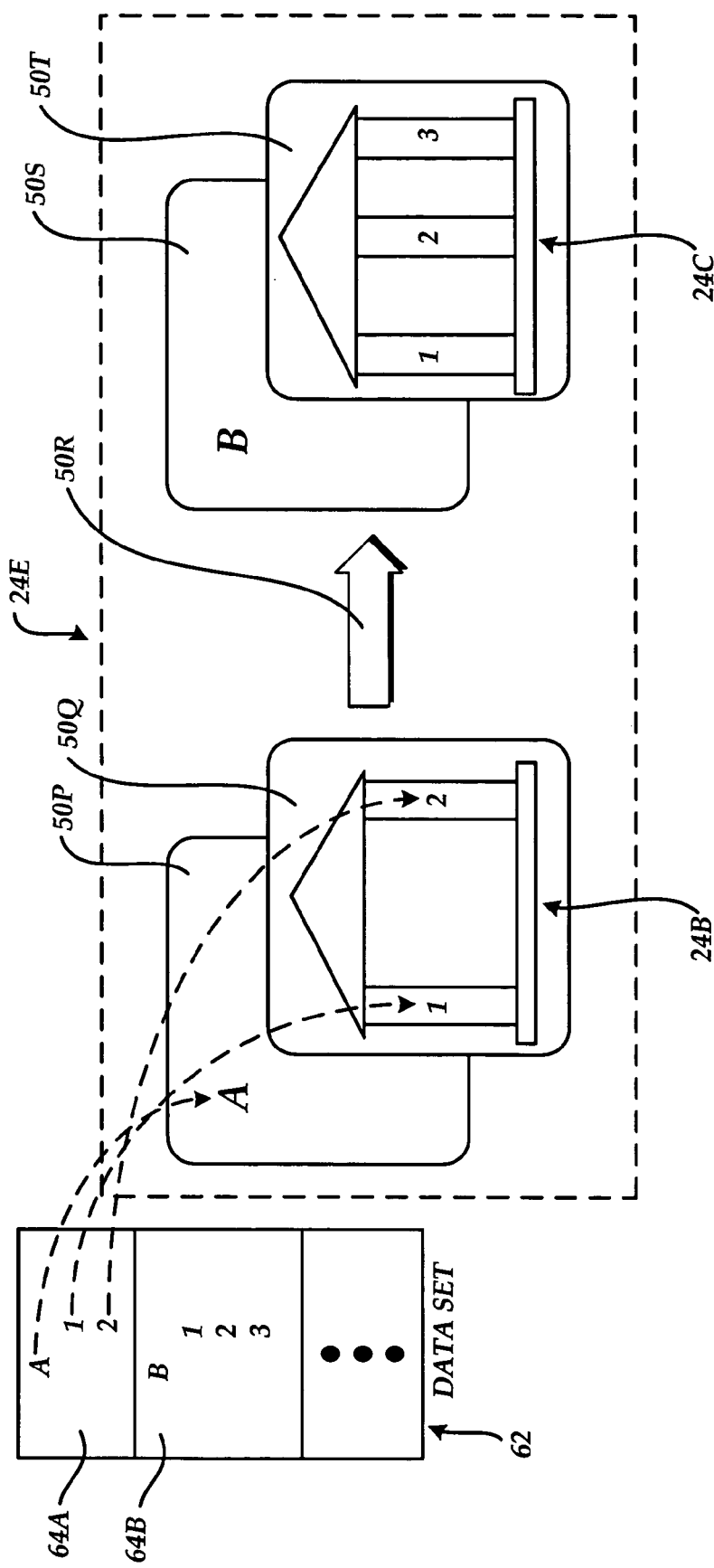

Turning now to FIG. 10, additional details will be described regarding aspects of the invention for utilizing graphics defined and created in the manner described herein as components within a larger diagram. As shown in FIG. 10, a graphic 24E may be created in which the shapes 50P, 50S, and 50R are generated dynamically. Any number of shapes may be generated in this diagram based upon the amount of data in the data set. As described above, dynamic graphics are graphics that may include a potentially infinite number of shapes that size and position themselves based upon the overall number of shapes required to hold the data. According to one embodiment of the invention, graphics defined and generated in the manner described herein may be utilized as components within a dynamically generated graphic.

As shown in FIG. 10, the shapes 50Q and 50T include the graphics 24B and 24C described above with respect to FIG. 9. The graphics 24B and 24C are defined and generated in the manner described above. However, a user may be permitted to specify that the graphics 24B and 24C are components within the dynamically generated graphic 24E. Moreover, a mapping may be defined between the data set 62 and graphics that are dynamically defined and statically defined. For instance, as shown in FIG. 10, a mapping has been defined that associates the top level of the data contained in the first entry 64A to the shape 50P. Data below the top level is assigned to the shapes within the graphic 24B. Accordingly, the graphic 24B has been customized to the data contained in the first entry 64A of the data set 62. In particular, the graphic 24B includes two pillars.

A mapping has also been defined that associates the top level of the data contained in the second entry 64B to the shape 50T. Data below the top level is assigned to the shapes within the graphic 24C. Accordingly, the graphic 24B has been customized to the data contained in the first entry 64A of the data set 62. In particular, the graphic 24C includes three pillars. It should be appreciated that if the graphic 24E is resized, the relative values defined for the size and position of the shapes within the graphics 24B and 24C may be utilized to effectively resize the shapes 50Q and 50T.

Figure 11:
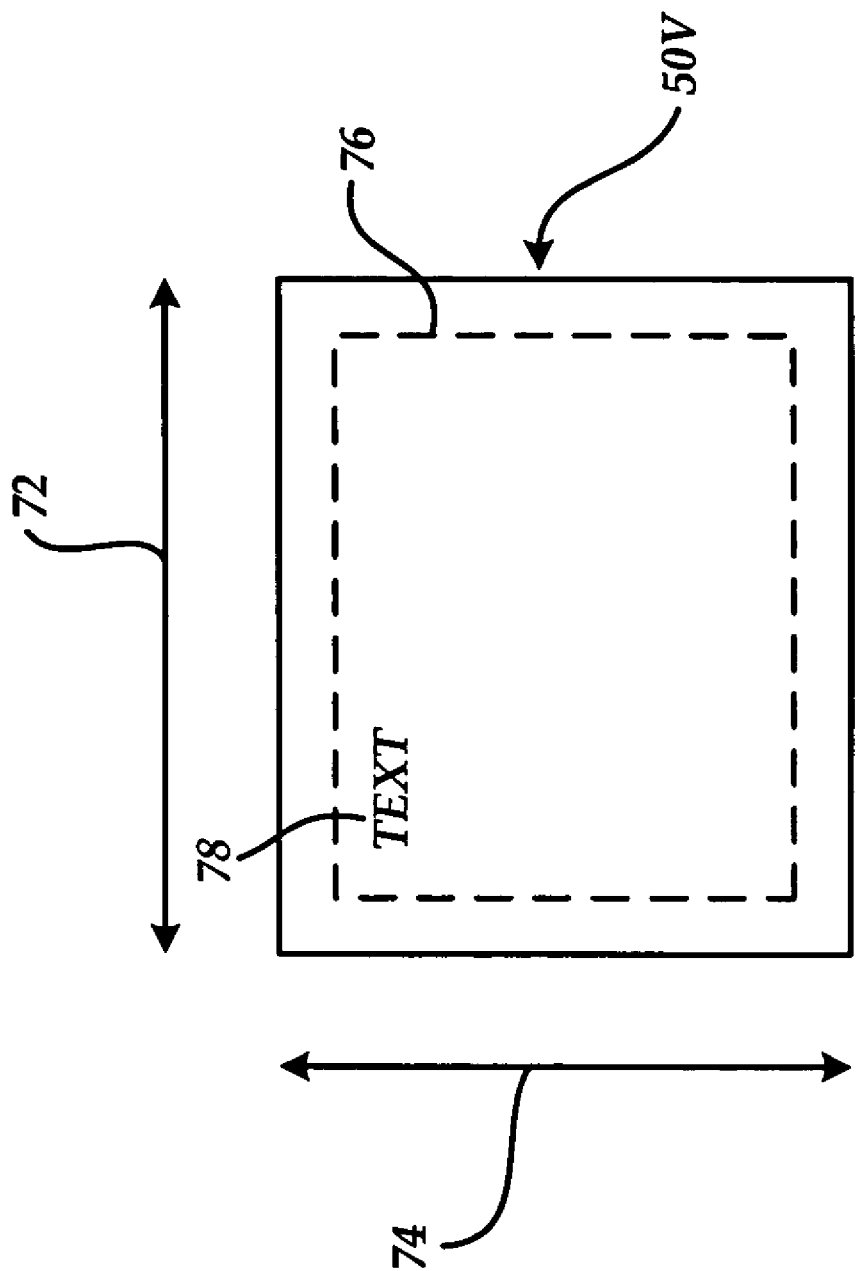
FIG. 11 is a block diagram illustrating several possible constraints for a shape utilized in one embodiment of the invention.

Referring now to FIG. 11, additional details regarding the aspects of a shape and its associated text that may be modified to ensure that the shape encompasses the text will be described. In particular, FIG. 11 shows a shape 50V. The shape 50V has associated text 78. The shape 50V also includes an inside margin 76, a vertical dimension 74, and a horizontal dimension 72. The vertical and horizontal dimensions of the shape 50V may be altered so that the text 78 will fit completely inside the shape. Similarly, the inside margin 76 may also be altered as specified to allow the text 78 to fit within the shape 50V. Attributes of the text 78, such as the font size and text alignment, may also be modified in an attempt to fit the text 78 within the shape 50V. It should be appreciated that the algorithms provided herein may be utilized on a body of text bound by any geometric shape.

The graphic definition file 40 includes constraint rules that define which attributes of the shape 50V and associated text 78 should be modified in attempt to fit the text 78 and the order in which they should be modified. It should be appreciated that the attributes of the shape 50V and text 78 shown in FIG. 11 and described herein are merely illustrative and that other attributes of a shape may be modified in an attempt to fit text within a shape. It should also be appreciated that the constraints and constraint rules may be specified on a per shape basis. Constraints and constraint rules may also be specified for a set of shapes.

Based on the foregoing, it should be appreciated that the various embodiments of the invention include a method and computer-readable medium for generating a graphic with a finite number of dynamically positioned and sized shapes. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for generating a graphic having a finite number of dynamically sized and positioned shapes, the method comprising:
   defining a relative size and position for a plurality of versions for each of the shapes, wherein defining the relative size and position for each of the versions of each of the shapes comprises complying with at least one constraint applied to at least one property for each of the shapes;
   accessing data defining the process for selecting a version from the plurality of versions for at least one of the shapes;
   receiving a data set to be mapped to the at least one of the shapes, the data set comprising at least one data entry;
   generating a mapping between each data entry and a shape based on the location of the data entry within the data set and the selected version, wherein the location of a first data entry is mapped to a first shape and the location of a second data entry is mapped to a second shape;
   generating the graphic by utilizing the mapping between data entries and shapes and by sizing and positioning the shapes relative to a current canvas size, wherein a look of the graphic is maintained in response to a change in the current canvas size, the look of the graphic comprising a size and a position of each dimension of each of the shapes relative to the current canvas size;
   propagating a state for the at least one constraint applied to the at least one property for at least one of the shapes to each of the other shapes;
   enforcing compliance with the at least one constraint applied to the at least one property for each of the shapes according to the propagated constraint state; and
   displaying, on a display device, the graphic.

2. The method of claim 1, wherein the size and position of each of the shapes are defined relative to the current canvas size.

3. The method of claim 2, wherein one of the size and position of at least one of the shapes are defined relative to another one of the shapes.

4. The method of claim 3, further comprising:
   detecting a new canvas size; and
   in response to detecting the new canvas size, resizing of each of the shapes relative to the new canvas size while maintaining the look of the graphic.

5. The method of claim 4, further comprising resizing text to fit the resized shapes.

6. The method of claim 5, wherein the number of shapes in the graphic, placement of the shapes, sizing of the shapes, and properties for the shapes is determined by the number of entries in the data set.

7. The method of claim 6, wherein defining a relative size and position of the shapes comprises:
   defining the size and position of each of the shapes on a canvas;
   translating the size and position of each of the shapes relative to the size of the canvas while maintaining the look of the graphic.

8. The method of claim 7, wherein defining the size and position of a shape comprises defining two points on the shape.

9. The method of claim 8, wherein defining the size and position of a shape comprises defining one point on the shape and the width of the shape.

10. The method of claim 9, wherein defining the size and position of a shape comprises defining one point on the shape and the height of the shape.

11. The method of claim 10, wherein the size and position of at least one of the shapes changes dynamically with a shape maintaining a relative position to at least one of the other shapes.

12. The method of claim 1, wherein generating the graphic by utilizing the mapping between data entries and shapes further comprises selecting a version of the graphic based on an amount of data in the data set.

13. The method of claim 1, further comprising displaying data within each shape associated with the mapped data entry in the data set.

14. The method of claim 1, further comprising selecting a version of a shape based on an amount of data in the mapped data entry in the data set.

15. A computer storage medium encoded with computer-executable instructions stored thereon which, when executed by a computer, will cause the computer to:
   store a size and a position for a plurality of versions for each of the shapes in a graphic, the size and position expressed relative to a canvas size;
   determining a version for each of the shares in the graphic;
   map entries in a data set to the determined version for each of the shapes based upon the location of each of the entries in the data set, wherein the location of a first data entry is mapped to a first shape and the location of a second data entry is mapped to a second shape;
   generating the graphic by utilizing the mapping between entries in the data set to shapes and by sizing and positioning the shapes relative to a current canvas size while maintaining the look of the graphic, the look of the graphic comprising a size and a position of each dimension of each of the shapes relative to the current canvas size;
   propagating a state for at least one constraint applied to at least one property for at least one of the shapes to each of the other shapes; and
   enforcing compliance with the at least one constraint applied to the at least one property for each of the shapes according to the propagated constraint state.

16. The computer storage medium of claim 15, wherein the position for each of the shapes may be specified relative to another one of the shapes.

17. The computer storage medium of claim 16, wherein the size and position for each of the shapes are defined by two points on the shape.

18. The computer storage medium of claim 17, comprising further computer-readable instructions which, when executed by the computer, will cause the computer to:
   detect a new canvas size; and
   in response to detecting the new canvas size, to size and position of each of the shapes relative to the new canvas size while maintaining the look of the graphic.

19. The computer storage medium of claim 18, wherein the graphic comprises a shape within a dynamic graphic.

20. A method for generating a graphic having a finite number of dynamically sized and positioned shapes, the method comprising;
   storing a relative size and position for each of the shapes, wherein the finite number of shapes in the graphic is determined by a number of entries in a data set, the size and position for each shape defined relative to a canvas size and to another shape, wherein a size and position of each axis of each shape is determined from one of the following: two points on a respective shape, one point on the respective shape and a width of the respective shape, and one point on the respective shape and a height of the respective shape;
   generating the graphic comprising a shape within a dynamic graphic, utilizing a mapping between entries in a data set and the shapes and by sizing and positioning the shapes relative to a current canvas size while maintaining the look of the graphic, the mapping between the entries in the data set and the shapes being based on locations of the entries within the data set, wherein the location of a first data entry is mapped to a first shape and the location of a second data entry is mapped to a second shape, wherein the mapping does not depend on data in the data set corresponding to the entries in the data set, and wherein the number of the shapes in the graphic, placement of the shapes, sizing of the shapes, and properties for the shapes is determined by the number of entries in the data set;
   displaying data within each shape associated with the mapped data entry in the data set;
   selecting a version of a shape during runtime based on an amount of data in the mapped data entry in the data set, wherein one or more versions of the shape are stored in a graphic definition file;
   propagating a state for at least one constraint applied to at least one property for at least one of the shapes to each of the other shapes;
   enforcing compliance with the at least one constraint applied to the at least one property for each of the shapes according to the propagated constraint state;
   detecting a change in the canvas size to a new canvas size;
   in response to the change, resizing the shapes relative to the new canvas size while maintaining the look of the graphic, the look of the graphic comprising a size and a position of each dimension of each of the shapes relative to the current canvas size;
   resizing the displayed data to fit the resized shapes; and
   displaying, on a display device, the graphic.

* * * * *

UNITED STATES PATENT AND TRADEMARK OFFICE
CERTIFICATE OF CORRECTION

PATENT NO.       : 7,750,924 B2
APPLICATION NO.  : 11/081323
DATED            : July 6, 2010
INVENTOR(S)      : Ilan Berker et al.

It is certified that error appears in the above-identified patent and that said Letters Patent is hereby corrected as shown below:

In column 1, lines 17-18, delete "Computer Readable" and insert -- Computer-Readable --, therefor.

In column 13, line 13, in Claim 15, delete "shares" and insert -- shapes --, therefor.

Signed and Sealed this
Nineteenth Day of July, 2011

David J. Kappos
*Director of the United States Patent and Trademark Office*